United States Patent

Walker

[11] Patent Number: 6,145,542
[45] Date of Patent: Nov. 14, 2000

[54] WATER TREATMENT APPARATUS FOR SCALE PREVENTION

[75] Inventor: David Walker, Huddersfield, United Kingdom

[73] Assignee: Liff Holdings Limited, United Kingdom

[21] Appl. No.: 09/254,749
[22] PCT Filed: Sep. 8, 1997
[86] PCT No.: PCT/GB97/02414
§ 371 Date: May 24, 1999
§ 102(e) Date: May 24, 1999
[87] PCT Pub. No.: WO98/11022
PCT Pub. Date: Mar. 19, 1998

[30] Foreign Application Priority Data
Sep. 11, 1996 [GB] United Kingdom ............... 9618961

[51] Int. Cl.⁷ ............................................. F15C 1/04
[52] U.S. Cl. .......................... 137/827; 123/538; 210/222
[58] Field of Search ........................... 137/827; 123/538; 210/222

[56] References Cited

U.S. PATENT DOCUMENTS

| | | |
|---|---|---|
| 4,865,747 | 9/1989 | Larson et al. |
| 4,938,875 | 7/1990 | Niessen ................... 210/222 |
| 5,074,998 | 12/1991 | De Baat Doelman ......... 210/222 |
| 5,171,431 | 12/1992 | Schulte . |
| 5,738,766 | 4/1998 | Jefferson ................. 210/222 |

FOREIGN PATENT DOCUMENTS

| | | |
|---|---|---|
| 92 13 423 U | 3/1993 | Germany . |
| 43 18 429 | 12/1994 | Germany . |
| 97/14655 | 4/1997 | WIPO . |

*Primary Examiner*—A. Michael Chambers
*Attorney, Agent, or Firm*—Madson & Metcalf

[57] ABSTRACT

An electrically operated device (10) for treatment of hardness of water in a pipe or other waterflow guidance or containment, and which includes an aerial (11) capable of being wrapped externally around a pipe (12); a mains-powered generator (13) for forming a waveform of a predetermined pattern and at a radio frequency; an output connection (15) on the generator to which the aerial can be connected to receive the waveform; and means for varying the frequency of the waveform to suit the diameter of pipe with which the device is to be used.

14 Claims, 1 Drawing Sheet

ABSTRACT

WATER TREATMENT APPARATUS FOR SCALE PREVENTION

Figure 1:
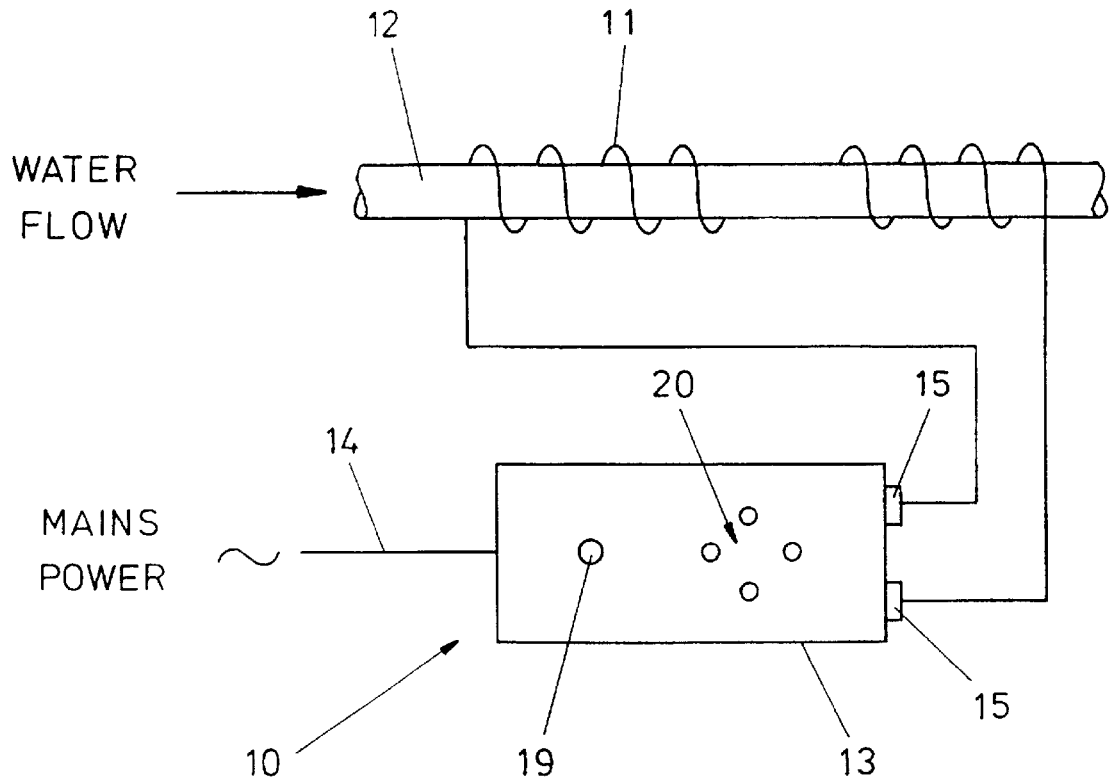

This invention relates to a water treatment apparatus.

There are many different techniques which are used in order to treat water, including chemical, magnetic and electric treatments, all of which seek to remove undesired solid particles which are dissolved or held in suspension in a body of water.

In the application of water treatment devices for domestic use, the main undesired materials to be removed are those which make water "hard", and which (if not treated) can cause build-up of deposits (limescale) on the internal walls of pipes and other water contact surfaces, such as in a boiler; and also excessive hardness of water requires increased use of soaps and detergents.

One electrical technique which has been proposed recently is to apply wires externally around water flow pipes (in the manner of an aerial), and to pass electrical currents through the wires at radio-type frequencies. The means by which these currents have a beneficial effect or treatment of the water flowing through the pipe is not entirely clear, but it is a scientifically accepted fact that there is a favourable influence on the dissolved ions (usually calcium ions), and which makes them less liable to form deposited layers on water contacting surfaces.

Known devices apply waveforms to the aerials which have varying frequencies, so as to have a desired influence on the dissolved ions. However, the desired waveforms for one diameter of pipe may not be suitable, or at least not as beneficial, for a pipe of a different diameter. Existing devices do provide predetermined waveforms of varying frequency, but in regularly repeated cycles, but do not provide any means of adjustment of the waveforms to suit different requirements.

The present invention addresses this problem, and provides, in a common design of apparatus, a means of adjustment to permit different frequencies of application of waveforms to suit different diameters of pipe.

According to the invention there is provided an electrically operated device for treatment of "hardness" of water in a pipe or other water-flow guidance or containment, said device comprising:

an aerial which is capable of being wrapped externally around a pipe;

a mains-powered generator for forming a waveform of a predetermined pattern and at radio frequency;

an output connection on the generator to which the aerial can be connected, to receive said waveform; and means for varying the frequency of the waveform to suit the diameter of pipe with which the device is to be used.

Thus, a device according to the invention, in a single piece of apparatus, is capable of being adjusted in its output of radio frequency waveform to suit different sizes of pipe.

The generator includes an oscillator which generates a required pattern of the waveform, and preferably a frequency adjuster is connected to the oscillator and which is adjustable to vary the frequency of the waveform.

In a practical example, the generator is housed within a casing, and a pair of output ports may be provided on the casing to which the ends of the aerial can be plugged-in. The frequency adjuster may be adjusted between different frequency settings by operation of a push-button or the like mounted externally on the casing.

In one example, four different frequencies of waveform can be selected, with the lowest frequency being set with one pressing of the push-button, and the highest frequency being set by consecutive pressing of the push-button four times.

A visual indicator may be provided on the casing, to indicate the frequency selected, and to show that the device is operating. A series of four indicator lights may be provided, and one (or more) can be arranged to be illuminated during setting (to indicate to the operator the setting which has been made), and thereafter the lights can be flashed on and off consecutively at a speed which is representative of the adjusted frequency of the waveform.

Figure 2:
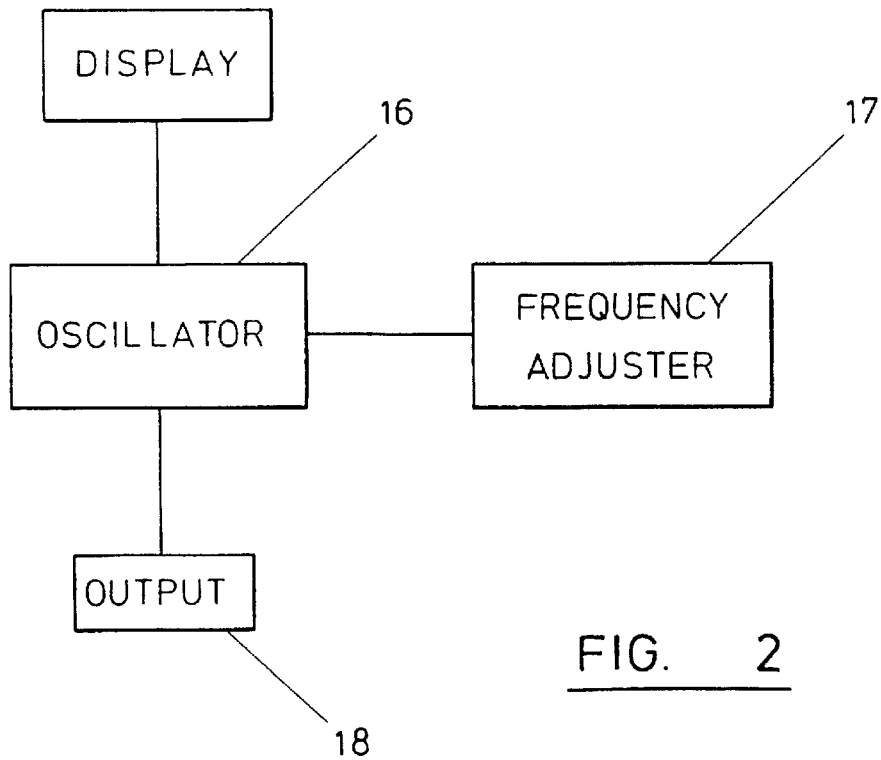

A preferred embodiment, of the invention will now be described in detail, by way of example only, and with reference to the accompanying schematic drawing, in which:

FIG. 1 shows an electrical mains powered device for treating water hardness, and having an aerial wrapped around a water flow pipe; and FIG. 2 is a block diagram of essential components of the electronic circuitry embodied within a casing of the device.

Referring now to FIG. 1 of the drawings, an electrically operated water treatment device according to the invention is designated generally by reference 10, and which includes an aerial 11 which is wrapped externally around a water flow pipe 12, and which has a casing 13 in which the electronic components of the device 10 are housed. A mains input supply line 14 supplies power to the device 10, and the ends of the aerial 11 are plugged-in to ports 15 on the casing 13.

The casing houses an oscillator 16 which is capable of generating a waveform of a predetermined pattern, and at radio frequency, and a frequency adjuster 17 is connected to the oscillator 16, and can be operated in order to vary the frequency of the waveform generated by oscillator 16, and supplied to output 18, to suit the diameter of pipe with which the device is to be used.

An external push-button 19 on the casing 13 can be operated in order to set the required frequency, and a visual display 20 on the casing 13 provides, firstly, visual indication of the frequency setting which has been made, and secondly also shows the device operating it the set frequency.

In the illustrated example, the visual display 20 comprises four separate lights, and setting of the device to the lowest frequency can be achieved by a single depression of push-button 19, which will initially illuminate a single one of the lights only. Thereafter, all four lights are flashed on and off consecutively, at a speed which is representative of the adjusted frequency of the waveform which has been set.

The lowest frequency of the waveform could be set for use with a pipe of smallest anticipated diameter, eg a 15 mm pipe, whereas two depressions of the push-button 19 might be suitable for a 22 mm pipe, three depressions for a 28 mm pipe and four depressions for a 35 mm pipe. The setting of the higher frequencies is indicated initially by the number of lamps which are illuminated together initially, and thereafter the frequency of flashing of the four lights consecutively provides a permanent indication of satisfactory operation of the device and at a speed which is representative of the frequency which has been set.

What is claimed is:

1. An electrically operated device for treatment of "hardness" of water in a pipe or other water-flow guidance or containment, said device comprising:

an aerial which is capable of being wrapped externally around a pipe;

a mains-powered generator for forming a waveform of a predetermined pattern and at a radio frequency;

an output connection on the generator to which the aerial can be connected, to receive said waveform; and means for adjusting the frequency of the waveform to a desired fixed frequency to suit the diameter of pipe with which the device is to be used.

2. A device according to claim 1, in which the generator includes an oscillator arranged to generate a required pattern of waveform.

3. A device according to claim 2, including a frequency adjuster connected to the oscillator, and adjustable to vary the frequency of the waveform.

4. A device according to claim 3, in which the frequency adjuster is adjustable between different frequency settings by operation of a push button or the like mounted externally on the casing.

5. A device according to claim 4, in which the frequency adjuster is adjustable between four different frequency settings of waveform, with the lowest frequency being set with one pressing of the push button, and the highest frequency being set by consecutive pressing of the push button four times.

6. A device according to claim 5, in which a visual indicator is provided on the casing, to indicate the frequency selected, and to show that the device is operating.

7. A device according to claim 6, in which a series of four indicator lights is provided, one of which can be arranged to be illuminated during setting to indicate to the operator the setting which has been made, and thereafter the lights can be flashed on and off consecutively at a speed which is representative of the adjusted frequency of the waveform.

8. A device according to claim 2, in which the generator is housed within a casing, and a pair of output ports is provided on the casing to which the ends of the aerial can be plugged-in.

9. A device according to claim 3, in which the generator is housed within a casing, and a pair of output ports is provided on the casing to which the ends of the aerial can be plugged-in.

10. A device according to claim 9, in which the frequency adjuster is adjustable between different frequency settings by operation of a push button or the like mounted externally on the casing.

11. A device according to claim 10, in which the frequency adjuster is adjustable between four different frequency settings of waveform, with the lowest frequency being set with one pressing of the push button, and the highest frequency being set by consecutive pressing of the push button four times.

12. A device according to claim 11, in which a visual indicator is provided on the casing, to indicate the frequency selected, and to show that the device is operating.

13. A device according to claim 12, in which a series of four indicator lights is provided, one of which can be arranged to be illuminated during setting to indicate to the operator the setting which has been made, and thereafter the lights can be flashed on and off consecutively at a speed which is representative of the adjusted frequency of the waveform.

14. A device according to claim 1, in which the generator is housed within a casing, and a pair of output ports is provided on the casing to which the ends of the aerial can be plugged-in.

* * * * *